United States Patent
Selstad et al.

(10) Patent No.: US 12,169,918 B2
(45) Date of Patent: *Dec. 17, 2024

(54) METHOD AND APPARATUS FOR CALIBRATING AUGMENTED REALITY HEADSETS

(71) Applicant: Ultrahaptics IP Two Limited, Bristol (GB)

(72) Inventors: Johnathon Scott Selstad, San Francisco, CA (US); David Samuel Holz, San Francisco, CA (US)

(73) Assignee: Ultrahaptics IP Two Limited, Bristol (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/367,947

(22) Filed: Sep. 13, 2023

(65) Prior Publication Data

US 2023/0419460 A1    Dec. 28, 2023

Related U.S. Application Data

(63) Continuation of application No. 17/741,096, filed on May 10, 2022, now Pat. No. 11,798,141, which is a
(Continued)

(51) Int. Cl.
  *G06T 5/80*    (2024.01)
  *G06T 19/00*   (2011.01)
  *G06T 19/20*   (2011.01)

(52) U.S. Cl.
  CPC .............. *G06T 5/80* (2024.01); *G06T 19/006* (2013.01); *G06T 19/20* (2013.01)

(58) Field of Classification Search
  None
  See application file for complete search history.

(56) References Cited

U.S. PATENT DOCUMENTS 5,659,475 A    8/1997  Brown
10,049,501 B1 *  8/2018  Richards ................. G06F 3/011
(Continued)

FOREIGN PATENT DOCUMENTS

EP       2378488 A2   10/2011
WO    2010148155 A2   12/2010

OTHER PUBLICATIONS

Grubert, Jens, et al. "A survey of calibration methods for optical see-through head-mounted displays." IEEE transactions on visualization and computer graphics 24.9 (2017): 2649-2662.*
(Continued)

*Primary Examiner* — Ryan M Gray
(74) *Attorney, Agent, or Firm* — Haynes Beffel & Wolfeld LLP; Andrew L. Dunlap; Franklin M. Schellenberg

(57) ABSTRACT

An AR calibration system for correcting AR headset distortions. A calibration image is provided to a screen and viewable through a headset reflector, and an inverse of the calibration image is provided to a headset display, reflected off the reflector and observed by a camera of the system while it is simultaneously observing the calibration image on the screen. One or more cameras are located to represent a user's point of view and aligned to observe the inverse calibration image projected onto the reflector. A distortion mapping transform is created using an algorithm to search through projection positions of the inverse calibration image until the inverse image observed by the camera(s) cancels out an acceptable portion of the calibration image provided to the screen as observed through the reflector by the camera, and the transform is used by the headset, to compensate for distortions.

20 Claims, 10 Drawing Sheets
(3 of 10 Drawing Sheet(s) Filed in Color)

Related U.S. Application Data continuation of application No. 16/675,071, filed on Nov. 5, 2019, now Pat. No. 11,354,787.

(60) Provisional application No. 62/756,053, filed on Nov. 5, 2018.

(56) References Cited

U.S. PATENT DOCUMENTS

| | | | |
|---|---|---|---|
| 10,191,276 B2 | 1/2019 | Du et al. | |
| 11,354,787 B2* | 6/2022 | Selstad | G06T 19/006 |
| 11,798,141 B2* | 10/2023 | Selstad | G06T 19/20 |
| 11,965,714 B2* | 4/2024 | Scales | G06T 7/32 |
| 2009/0128564 A1 | 5/2009 | Okuno | |
| 2010/0302015 A1 | 12/2010 | Kipman et al. | |
| 2013/0335318 A1 | 12/2013 | Nagel et al. | |
| 2014/0098018 A1 | 4/2014 | Kim et al. | |
| 2014/0225918 A1 | 8/2014 | Mittal et al. | |
| 2015/0016777 A1 | 1/2015 | Abovitz et al. | |
| 2015/0093042 A1 | 4/2015 | Zhu et al. | |
| 2015/0193980 A1 | 7/2015 | Pedley et al. | |
| 2015/0234569 A1 | 8/2015 | Hess | |
| 2015/0258432 A1 | 9/2015 | Stafford et al. | |
| 2016/0012643 A1 | 1/2016 | Kezele et al. | |
| 2016/0093105 A1 | 3/2016 | Rimon et al. | |
| 2016/0103318 A1 | 4/2016 | Du et al. | |
| 2016/0180501 A1 | 6/2016 | Mallet | |
| 2016/0253795 A1 | 9/2016 | Cole et al. | |
| 2016/0328882 A1 | 11/2016 | Lee et al. | |
| 2017/0011555 A1 | 1/2017 | Li et al. | |
| 2017/0070729 A1 | 3/2017 | Li et al. | |
| 2017/0193687 A1 | 7/2017 | Lo et al. | |
| 2019/0073820 A1 | 3/2019 | Barron | |
| 2019/0156555 A1 | 5/2019 | Lo et al. | |
| 2019/0166339 A1 | 5/2019 | De La Cruz et al. | |
| 2019/0339529 A1 | 11/2019 | Malaika et al. | |
| 2022/0100456 A1 | 3/2022 | Kakizaki et al. | |
| 2023/0025684 A1 | 1/2023 | Islam et al. | |

OTHER PUBLICATIONS

Plopski, A., et al. "Automated Spatial Calibration of HMD Systems with Unconstrained Eye-cameras. To appear." Mixed and Augmented Reality (ISMAR), 2016 IEEE International Symposium on.*

Fuhrmann, Anton, Dieter Schmalstieg, and Werner Purgathofer. "Practical calibration procedures for augmented reality." Virtual Environments 2000: Proceedings of the Eurographics Workshop in Amsterdam, The Netherlands, Jun. 1-2, 2000. Springer Vienna, 2000.

Lee, Sangyoon, and Hong Hua. "A robust camera-based method for optical distortion calibration of head-mounted displays." Journal of Display Technology 11.10 (2014): 845-853.

Sasaki, Takayuki, and Masahiro Baba. "Optical distortion correction for eyeglasses-type wearable device using multi-mirror array." 2016 IEEE International Conference on Image Processing (ICIP). IEEE, 2016. (Year: 2016).

* cited by examiner

METHOD AND APPARATUS FOR CALIBRATING AUGMENTED REALITY HEADSETS

RELATED APPLICATION

This application is a continuation of U.S. Non-Provisional patent application Ser. No. 17/741,096, entitled "METHOD AND APPARATUS FOR CALIBRATING AUGMENTED REALITY HEADSETS", filed May 10, 2022, which is a continuation of U.S. Non-Provisional patent application Ser. No. 16/675,071 (now U.S. Pat. No. 11,354,787), entitled "METHOD AND APPARATUS FOR CORRECTING GEOMETRIC AND OPTICAL ABERRATIONS IN AUGMENTED REALITY", which issued Jun. 7, 2022 and claims the benefit of U.S. Provisional Patent Application No. 62/756,053, entitled "METHOD AND APPARATUS FOR CORRECTING GEOMETRIC AND OPTICAL ABERRATIONS IN AUGMENTED REALITY", filed Nov. 5, 2018. The priority applications are hereby incorporated by reference for all purposes.

ADDITIONAL INCORPORATIONS

U.S. patent application Ser. No. 14/626,898, entitled "SYSTEMS AND METHODS OF CREATING A REALISTIC GRAB EXPERIENCE IN VIRTUAL REALITY/AUGMENTED REALITY ENVIRONMENTS," filed on Feb. 19, 2015, now U.S. Pat. No. 9,696,795, issued Jul. 4, 2017 is hereby incorporated by reference for all purposes as if fully set forth herein.

FIELD OF THE TECHNOLOGY DISCLOSED

The technology disclosed relates generally to special calibration techniques for compensating for augmented reality (AR) headsets. More specifically the disclosed technology relates to calibrating AR headsets to account for distortion caused by manufacturing deviations, differences in user head shape and eye location and shifting of the AR headset during use.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Augmented Reality (AR) technology refers to real time registration of 2D or 3D computer generated imagery onto a live view of a real-world physical space. When using AR technology, a user is able to view and interact with the augmented imagery in such a way as to manipulate the virtual objects in their view.

Users of AR headsets and the like are come in all shapes and sizes. For example, the head shape and size of different users can vary dramatically. Further, eye location and interpupillary distance (IPD) can very between each user. Additionally, AR headsets are manufactured based on an average person's head shape, head size, eye location and IPD, leaving the user with an AR headset that is designed for the average person. Also, during the manufacturing process there are often manufacturing deviations that can result in AR headsets having different alignments, etc. Furthermore, during use of the AR headset, the headset can be moved on the user's head, thus changing the alignment of the AR headset during use. In order to provide the best possible AR experience, the AR headset should be calibrated to compensate for these manufacturing deviations, the physical differences of each user and the shifting of the AR headset on the user's head during use.

Calibration and alignment are more challenging in AR than in virtual reality (VR). In VR, users' brains often gloss over mismatches in time and space, because the user has nothing to visually compare them to. In AR, one can see the virtual and real worlds simultaneously. Unlike in VR, any spatiotemporal mismatch can be visually compared against the real world, which is an unforgiving standard that requires a high degree of accuracy. For AR, that accuracy needs to be maintained across a much wider field of view than for earlier-generation AR headset designs. For AR headsets with a wide field of vision (FoV), calibration and alignment are more challenging than for headsets with a narrow FoV, because headsets with a wide FoV have optics that create a stereo-divergent off-axis distortion that cannot be accurately modelled with conventional radial polynomials.

3D printing is an ongoing revolution in low volume manufacturing of AR headsets. While using 3D printing for generating AR headsets is economical, it comes at the expense of mechanical deviations, as mentioned above. Optics generally require extremely tight tolerances. Given the choice, optic designers prefer their designs to be machined from solid granite. Given the weight and cost associated with granite, they are forced to solve the problem some other way.

Consequently, there is a need for using an AR calibration system to compensate for distortions caused by manufacturing deviations in an AR headset and to compensate for physical differences in users and shifting of the AR headset during use.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings. The patent or application file contains at least one drawing executed in color. Copies of this patent or patent application publication with color drawing(s) will be provided by the Office upon request and payment of the necessary fee. The color drawings also may be available in PAIR via the Supplemental Content tab.

FIG. 7 and FIG. 8 list an example distortion mapping transform, expressed in JSON that gets loaded onto an AR headset.

FIG. 9 illustrates an example distortion mapping transform for a specific AR headset including specific metadata for the specific AR headset.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Manufacturers of augmented reality (AR) headsets need an AR calibration system that can compensate for distortions caused by manufacturing deviations in the AR headsets as well as differences in the head shape of a user (e.g., interpupillary differences (IPDs) and movements of the AR headset with respect to the user's head during use. In static optical systems, it usually is not worth going through the trouble of determining per-headset optical models for distortion correction. However, near-eye displays are anything but static. Also, as mentioned above, eye positions change due to different peoples' head sizes, IPDs and headset ergonomics, as well as the gradual shift of the headset on the head over a session. Any one of these factors alone can hamper the illusion of AR.

The disclosed AR calibration system includes calibration techniques for (i) creating a distortion mapping transform to compensate for distortions in AR headsets caused by manufacturing deviations and (ii) updating and/or creating a new distortion mapping transform to compensate for distortions in AR headsets caused by users having different head shapes and IPDs as well as shifting of the AR headset during use thereof by using eye tracking calibration techniques. These calibration techniques enable improved user experience, greater safety, and greater functionality to users of AR headsets for gaming, machine control and/or machine communications applications.

The AR visual illusion created by wide-field-of-view displays and optics motivates the need for the disclosed calibration and distortion mapping transform for generating coherent images for the wearer's eyes. The benefits of the technology disclosed include solving for physically accurate parameters with a system-in-the-loop approach that allows for extrapolating new viewpoints for distortion compensation. The technology disclosed is unaffected by the calibration of the measurement device, which increases accuracy and avoids local minima that single camera systems get caught in, so it remains valid even at new or different view positions than the view positions used for calibration. Next, an example AR calibration system is described for calibrating an AR headset.

Figure 1:
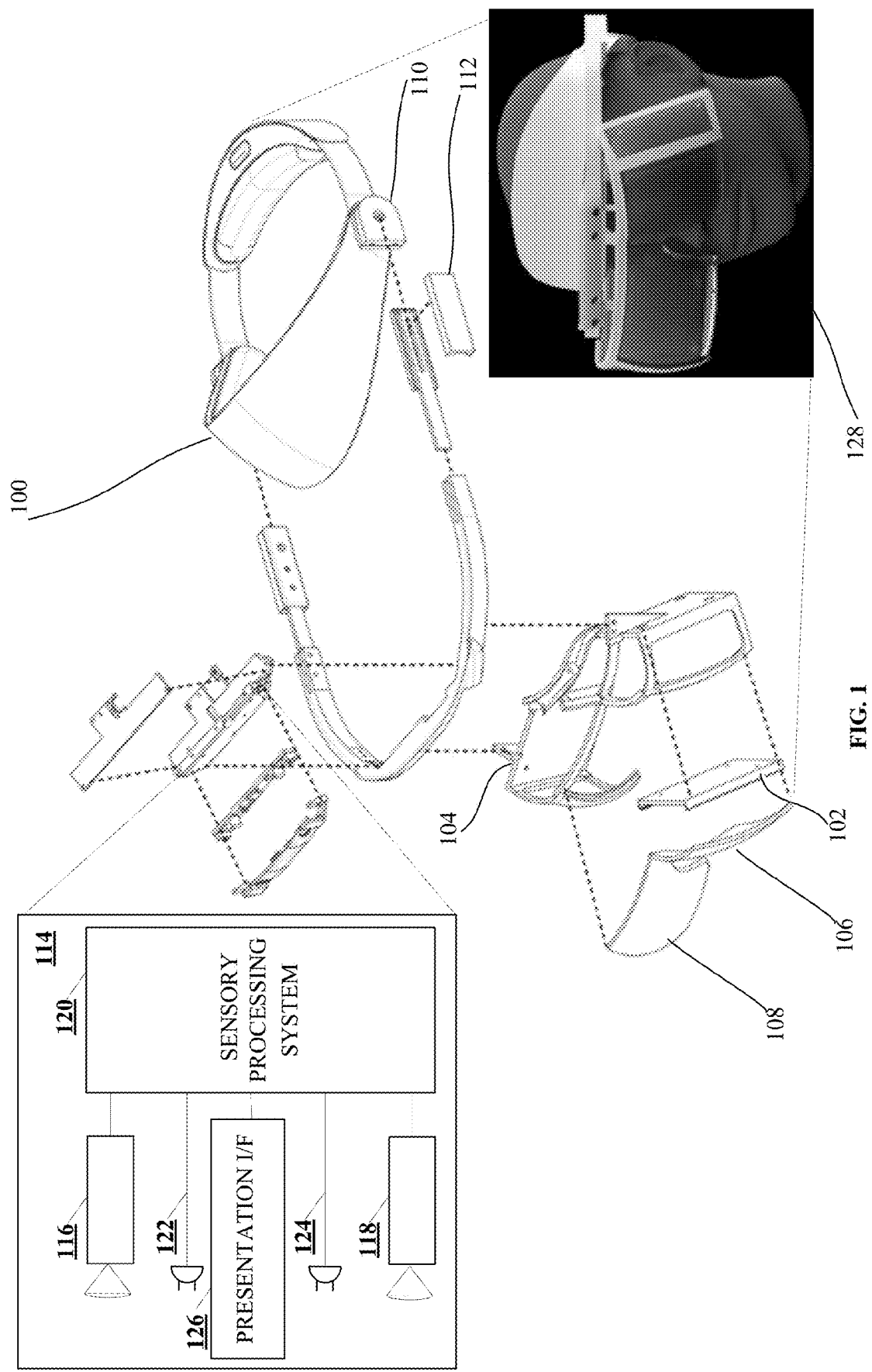
FIG. 1 illustrates an augmented reality (AR) headset and a block diagram of components of the AR headset according to an implementation of the technology disclosed.

FIG. 1 illustrates an AR headset 100 and a block diagram of components of the AR headset 100 according to an implementation of the technology disclosed. Specifically, FIG. 1 illustrates an example AR headset 100 that uses the disclosed AR calibration system to compensate for distortions caused by manufacturing deviations of the AR headset 100. The AR headset 100 can be a personal head mounted display (HMD) having a goggle form factor such as shown in FIG. 1. The disclosed calibration system can compensate for distortions that originate due to headset manufacturing deviations. Similar techniques can be implemented, as discussed below, to compensate for differences in head shape/size and IPDs of different users.

AR headset 100 includes two displays 102, 104, one for the left eye of the user and one for the right eye of the user. Display 102 can be referred to as a left-eye display and display 104 can be referred to as a right-eye display. These displays 102, 104 face toward reflectors 106, 108 located in front of the user when the AR headset 100 is worn by the user. Just like the displays 102, 104, reflector 106 can be referred to as a left-eye reflector and reflector 108 can be referred to as a right-eye reflector. The reflectors 106, 108 respectively reflect the light coming from the displays 102, 104, and into the wearer's eyes.

AR headset 100 also includes rotation adjustment 110 for changing an alignment of the AR headset 100 while on the user's head, and a slide adjustment 112 for changing a distance of the reflectors 106, 108 from the wearer's eyes.

Additionally, the AR headset 100 includes a system 114 including hardware and software for driving the displays 102, 104 as well as tracking the eyes of the user. Specifically, the system 114 includes a number of cameras 116, 118 coupled to a sensory processing system 120. Cameras 116, 118 can be any type of camera, including cameras sensitive across the visible spectrum or with enhanced sensitivity to a confined wavelength band (e.g., the infrared (IR) or ultraviolet bands); more generally, the term "camera" herein refers to any device (or combination of devices) capable of capturing an image of an object and representing that image in the form of digital data. For example, line sensors or line cameras rather than conventional devices that capture a two-dimensional (2D) image can be employed. The term "light" is used generally to connote any electromagnetic radiation, which may or may not be within the visible spectrum, and may be broadband (e.g., white light) or narrowband (e.g., a single wavelength or narrow band of wavelengths). Cameras 116, 118 are preferably capable of capturing video images (i.e., successive image frames at a constant rate of at least 15 frames per second); although no particular frame rate is required. The capabilities of cameras 116, 118 are not critical to the technology disclosed, and the cameras 116, 118 can vary as to frame rate, image resolution (e.g., pixels per image), color or intensity resolution (e.g., number of bits of intensity data per pixel), focal length of lenses, depth of field, etc. The cameras 116, 118 need to have a higher resolution than the features of the calibration image. In one implementation, the resolution of the cameras 116, 118 is similar to the resolution of the AR headset display resolution. Additionally, the cameras 116, 118, in an implementation, have a field of view that is high (wide) enough to capture, alone or in combination, the entirety of the images reflected off of the reflectors 106, 108. In general, for a particular application, any cameras capable of focusing on objects within a spatial volume of interest can be used.

Sensory processing system 120, which can be, e.g., a computer system, can control the operation of cameras 116, 118 to capture images of the region of interest.

The system 114 can also include sensors 122, 124 to capture motions of the AR headset 100 or other components and/or individual related thereto. Information from sensors 122, 124 can be applied to models of images taken by cameras 116, 118 to cancel out the effects of motions of the AR headset 100, providing greater accuracy to the augmented reality experience rendered by AR headset 100. For some implementations, another video input device can be utilized to generate a digitized video image of the images. The cameras 116, 118 can be any digital device that is dimensioned and configured to capture still or motion pictures and to convert those images to a digital stream of information that can be manipulated by a computer. For example, cameras 116, 118 can be digital still cameras or digital video cameras, and the like.

Continuing with the description of system 1000, presentation interface 126 employs presentation techniques in conjunction with the sensory based tracking in order to present virtual (or virtualized real) objects (visual, audio, haptic, and so forth) created by applications loadable to, or in cooperative implementation with, the AR headset 100 to provide a user of the device with a personal augmented reality experience. Presentation can include an image or other visual representation of an object. The presentation interface 126 is what drives the displays 102, 104 to display images and can also use the distortion mapping transforms (as obtained from the calibration performed after the manufacturing to compensate for manufacturing deviations and as obtained from calibrations performed while the user is interacting with the AR environment) to adjust images displayed by the displays 102, 104.

As briefly discussed above, calibration and alignment are more challenging for AR headsets with a wide FoV, because they have optics that create a stereo-divergent off-axis distortion that cannot be accurately modelled with conventional radial polynomials. This high standard of accuracy requires a distortion model that represents the physical geometry of the optical system.

While modern small-scale prototyping techniques for AR headsets provide excellent price efficiency, this comes at the cost of lower mechanical tolerancing, relative to the requirements of near-eye optical systems. Distortions are locally linear, but as the FoV increases, the amount of non-linearity a single continuous distortion function needs to cover increases substantially. It is necessary to measure mechanical deviations of the optical elements to create a valid distortion mapping transform.

In optics, modeling an optical system by raytracing is very effective. Raytracing makes it possible to find the mapping between eye space and screen space. Raytracing refers to the process of tracing the path rays of light travel from the light source, through the optical system, to the eye. That is, raytracing is a rendering technique for generating an image by tracing the path of light as pixels in an image plane and simulating the effects of its encounters with virtual objects. Raytracing makes it possible to simulate where a given ray of light entering the eye came from on the display, so one can precisely map the distortion between the eye and the screen. By measuring where an eye ray lands on the screen, one can construct a distortion mesh which represents how the image needs to be distorted on the screen to compensate for the distortion of the optical system and achieve a rectilinear image again. This distortion is the inverse of the distortion of the optical system. For computational convenience, these rays are typically cast out backwards—from the eye towards the screen, since light travels along the same path regardless of its direction. This allows the system to only consider the rays of light that interact with the eye. Raytracing makes it possible to parameterize distortion in terms of physical elements.

Raytracing is inexpensive and effective when optics are known. However, 3D printing of AR headsets and ergonomics make optics unknown. By capturing images on a monitor through the AR headset 100, the optics can be defined, which makes possible real time IPD adjustment and eye tracking, in addition to the disclosed methods for compensating for distortions caused by manufacturing deviations in the AR headset 100. By combining the raytracing model with eye tracking, one can compensate for these inconsistencies in real time.

Additionally, reference element 128 illustrates the AR headset 100 placed on the head of a user.

Figure 2:
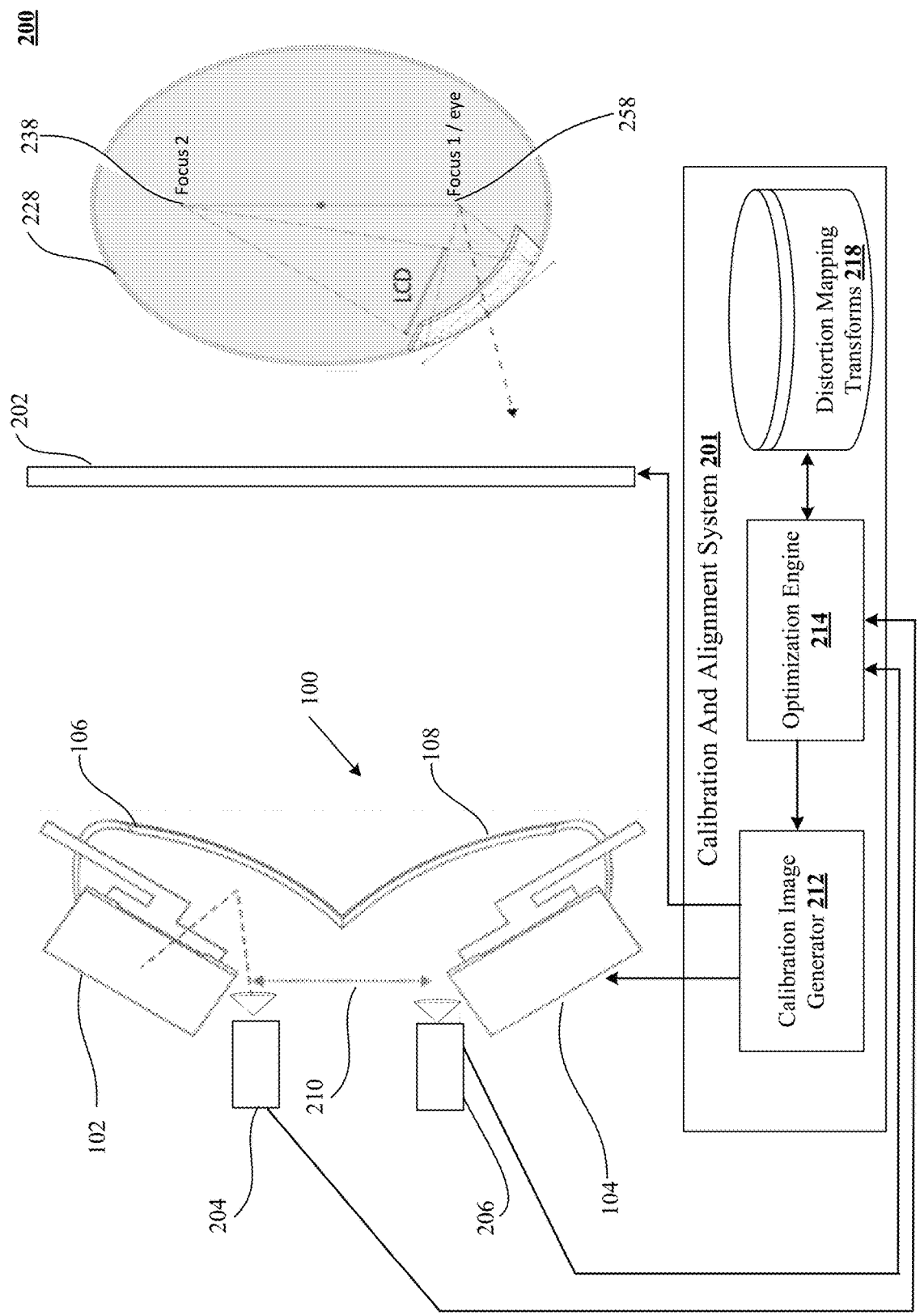
FIG. 2 illustrates a block diagram of a calibration and alignment system, an external display screen, and a top view of the AR headset illustrated in FIG. 1, according to an implementation of the technology disclosed.

FIG. 2 illustrates a block diagram of an AR calibration rig 200 that includes a calibration and alignment system 201, and an external display screen 202. FIG. 2 also illustrates a top view of the AR headset 100, as illustrated in FIG. 1 that is to be calibrated using the AR calibration rig 200. The AR headset 100 includes displays 102, 104 and reflectors 106, 108, as previously discussed with reference to FIG. 1. The AR calibration rig 200 also includes cameras 204, 206, which act as the user's eyes for purposes of calibrating the AR headset 100. The AR calibration rig 200 may include more cameras or may use a single camera. Further, the AR calibration rig 200 also includes a stationary stand (not illustrated) for holding the AR headset 100 at a specific height and specific distance from the cameras 204, 206, so that calculations performed by the calibration and alignment system 201 can be based on known distances and heights. Additionally, the cameras 204, 206 are placed at a distance from the reflectors 106, 108 so as to replicate a distance of the user's eyes. This replicated distance can be determined based on an optimum known distance from the reflectors 106, 108 or a distance that is suitable for most users of the AR headset 100. The cameras 204, 206 can also be adjusted to replicate a desired IPD 210. The desired IPD 210 can be based on an optimum known IPD or an IPD that is within a generically known average of IPDs.

The calibration and alignment system 201 includes a calibration image generator 212, an optimization engine 214 and a database that stores distortion mapping transforms 218. The calibration image generator 212 provides a calibration image to the external display screen 202 that is external to the AR headset 100 and that is viewable through the reflectors 106, 108 of the AR headset 100. The calibration image generator 212 also provides an inverse of the calibration image (i.e., an inverse calibration image) to the displays 102, 104 of the AR headset 100, such that the inverse calibration image is reflected off of the respective reflectors 106, 108 and observed by cameras 204, 206 of the AR calibration rig 200 while the cameras 204, 206 are simultaneously observing the calibration image on the external display screen 202. As mentioned above, cameras 204, 206 of the AR calibration rig 200 are located inside the AR headset 100 at a location representing a user's point of view.

Continuing the description of FIG. 2, cameras 204, 206 of the AR calibration rig 200 are aligned to a position within AR headset 100 that allows the cameras 204, 206 to observe, from an optimal viewing location, the calibration image projected onto reflectors 106, 108 of the AR headset 100.

The optimal view location can be determined based on a location of a focus, such as Focus 1 258 illustrated in FIG. 2. Ellipsoids are defined by a pair of Foci and the length of their Minor Axis. Reflector ellipsoid 228 shows the optimal view location, Focus 1 258. The light that comes from Focus 2 238, which one of the displays 102, 104 is in line with, will converge on Focus 1 258. In another implementation, a different reflector design with a different reflector shape, even aspheric reflectors, can be utilized with the disclosed calibration system. The optimal view location can be determined in other ways that will be apparent to a person of ordinary skill in the art and can be based on, for example, observed or obtained user information, average IPD, etc.

The optimization engine 214 receives images captured by the cameras 204, 206 and creates a distortion mapping transform by implementing an algorithm to search through various projection positions of the inverse calibration image provided to the displays 102, 104 of the AR headset 100 until the inverse calibration image observed by each camera 204, 206 cancels out an acceptable portion of the calibration image provided to external display screen 202 as observed, by the cameras 204, 206 through the reflectors 106, 108. The optimization engine 214 is able to create the distortion mapping transform to be individualized for each of the user's eyes (i.e., individualized for each of the cameras 204, 206) by independently searching through the various projection positions of the inverse calibration image as provided to and projected by the displays 102, 104. The distortion mapping transforms 218 store the transforms created by the optimization engine 214. In a different implementation calibration and alignment system 201 can utilize a different organization of functional blocks that result in storing distortion mapping transforms 218 for each distinct AR headset 100 that is calibrated by the AR calibration rig 200.

The AR calibration rig 200 is configured to essentially peer through an optical system (e.g., the AR headset 100) to gain insight into the alignment of the optical system. By comparing the virtual image (e.g., inverse calibration image) against a real-world reference (e.g., the calibration image) it is possible to measure an aggregate deviation of the components in the optical system (e.g., the AR headset 100). By using a class of algorithms called numerical optimizers, it is able to solve for the configuration of optical components that minimizes the distortion mismatch between the real-world reference (e.g., the calibration image displayed by the external display screen 202) and the virtual image (e.g., the inverse calibration image projected by the displays 102, 104). These algorithms are implemented by the optimization engine 214. As the optimization engine 214 implements the algorithms it then provides transform information to apply to the inverse calibration image and/or provides an updated inverse calibration image to the calibration image generator 212 to be provided to the displays 102, 104. These algorithms essentially "jiggle" the inverse calibration images provided to the displays 102, 104 until the reflected calibration images cancel out a sufficient amount of the calibration image displayed by the external display screen 202. This "jiggling" of the inverse calibration images is a simplified explanation of the algorithms. More complex algorithms can be implemented, such as gradientless optimization algorithms (e.g., a Nelder-Mead algorithm). Further, a neural network can be trained and implemented to perform the optimization.

Moreover, the calibration and alignment system 201 handles optical raytracing and 3D rendering. Calibration and alignment system 201 triangulates the position and orientation of external display screen 202 relative to the stationary testing base of the AR headset 100, displaying a pattern with a sequence of dots on the external display screen 202. The dots are detected and triangulated individually, which allows for the six degrees of freedom positioning of the external display screen 202 with respect to the AR headset 100 and/or the cameras 204, 206.

Calibration image generator 212 renders the inverse of the calibration image displayed on external display screen 202 so as to be displayed by the displays 102, 104 and projected to the reflectors 106, 108 in the same position as the calibration image is perceived by the cameras 204, 206 through the reflectors 106, 108. If the inverse calibration images reflected by the reflectors 106, 108 match up perfectly with the calibration image displayed by the external display screen 202, the calibration image displayed by the external display screen 202 will be additively canceled out to uniform white as perceived through the cameras 204, 206. The optimization engine 214 can measure the deviation from perfect white as the distortion error caused by the manufacturing deviations of the physical optical system of the AR headset 100. Note that the external display screen 202 and the AR headset 100 each have their own non-linear gamma curves which negate the additive white phenomenon in theory but have a negligible effect in practice.

Turning back to the optimization algorithms implemented by the optimization engine 214, optimization engine 214 runs a gradientless simplex optimizer system-in-the-loop to independently search through various projection positions of the inverse calibration image provided to the displays 102, 104 until the inverse calibration image(s) observed by the cameras 204, 206 cancel out an acceptable portion of the calibration image provided to external display screen 202 as observed through the reflectors 106, 108 by the cameras 204, 206. In one implementation, the system-in-the-loop gradient-less optimizer is a Nelder-Mead optimizer to converge on an acceptable optical configuration with a very high degree of precision.

As illustrated in FIG. 2, the AR calibration rig 200 includes two cameras 204, 206, (a right-eye camera and a left-eye camera). In another implementation, there can be only a single camera. The single camera may need to be place further away such that it can observe reflections from both reflectors 106, 108. In another implementation, there can be more than two cameras. For example, there can be two cameras for each reflector (e.g., first and second right-eye cameras and first and second right-eye cameras). The four cameras could be arranged, so that there is an upper and lower right-eye camera and an upper and lower left-eye camera. Other camera configurations will be apparent to a person of ordinary skill in the art. Regardless of whether one, two or four cameras are used, or some other configuration of cameras, the optimization engine 214 implements the optimization algorithms based on the inverse calibration image(s) and the calibration image observed by the cameras to create the distortion mapping transforms 218. Once a distortion mapping transform is created for a particular AR headset 100, the distortion mapping transform can be loaded onto the AR headset 100 prior to delivery to a retailer or an end user (e.g., the distortion mapping transform can be loaded onto the firmware of the AR headset 100). Alternatively, the end user of the AR headset 100 can obtain the specific distortion mapping transform by entering in a serial number during setup of the AR headset 100 and obtaining a download of the specific distortion mapping transform based on the serial number. Other ways of obtaining the specific distortion mapping transform that corresponds to the specific AR headset will be apparent to a person of ordinary skill in the art.

When the calibration is implemented using two cameras allows the calibration to observe the optics from each camera (or eye) simultaneously, allowing the technology disclosed to provide distortion mapping transforms resulting in an accurate optical system for each AR headset 100 that can be raytraced from any perspective.

Additional implementations of the technology disclosed include (i) each vertex of a distortion mesh observed by the cameras being independent, but traveling along a fixed set of optical elements, wherein the distortion mesh can be recomputed in a vertex shader of a graphical processing unit of the AR headset 100 and (ii) the distortion mesh being multi-threaded and vectorized on a central processing unit of the AR headset 100, resulting in optimizations coming in under a fifth of a millisecond per eye. Accordingly, it is possible to perform numerical optimization without a gradient when the cost function is quick to evaluate (i.e., a "one-shot" photometric quality metric that is able to calibrate using a single calibration image as opposed to structure light or gray code mapping that would require multiple calibration images to get a similar fit quality estimate) and there are few free parameters. Nelder-Mead is the most popular of these gradientless optimizers due to its performance and simplicity of implementation. However, a person of ordinary skill in the art would understand that other types of gradientless optimizers can be implemented. Furthermore, a benefit of using the inverted calibration image that is essentially overlaid onto the calibration image, is that it is possible to use additive color synthesis to create a dense photometric cost function that allows for this 'one-shot' (i.e., one image) estimation of the quality of the distortion correction.

These same calibration techniques can be used to update the distortion mapping transform generated using the AR calibration rig 200 during actual use of the AR headset 100 by an end user. As discussed earlier, the AR headset 100 can move and shift during use, necessitating some intelligent distortion correction that can compensate for the moving and shifting, and that can take into account the user's head motion as well as differences in head shape, head size and IPDs of various users. In other words, the calibration performed by the calibration rig 200 can compensate for manufacturing deviations by calibrating the AR headset 100 based on the view point of a "generic" user or an "average" user, but it cannot compensate for different users having different physical features and for the moving and the shifting of the AR headset 100 during use.

This "during use" calibration can be performed by contemporaneously updating the distortion mapping transform implemented by the AR headset 100 while the user is in an AR experience. Specifically, the "during use" calibration can be performed for each display frame of the AR experience by implementing the cameras 116, 118 (see FIG. 1) and/or sensors 122, 124 (see FIG. 1) to perform eye tracking to identify (i) a location of one or more of the user's eyes with respect to the reflectors 106, 108 and or display 102, 104 of the AR headset 100 and/or (ii) a viewing direction of one or more of the user's eyes with respect to the reflectors 106, 108 and or display 102, 104 of the AR headset 100. After the performing of the eye tracking, the technology disclosed can, for each display frame, update the distortion mapping transform to compensate for (i) a change in the identified location of either of the user's eyes with respect to the reflectors 106, 108 and or display 102, 104 of the AR headset 100 and/or (ii) a change in the identified viewing direction of either of the user's eyes with respect to the reflectors 106, 108 and or display 102, 104 of the AR headset 100. Once the distortion mapping transform is updated, the updated distortion mapping transform can be implemented in a next displayed frame of the AR experience. Accordingly, the AR headset 100 can be continuously self-calibrating during the user's AR experience. This "during use" calibration essentially performs physical modelling by tracking the location and/or viewing direction of one or more of the user's eyes. This physical modelling allows for tracking 3D pupil position to adjust the distortion in real-time to compensate for eye movements and movement and shifting of the AR headset 100.

When using two cameras to perform eye tracking it is possible to optimize/calibrate for an optical configuration that appears correct when raytraced from two perspectives for each eye. Physical modelling is better at the "tails" and fitting a physical model with a proper function allows for extrapolation and better behavior at extreme ends of the "fit." In contrast, polynomial "fits" often quickly diverge and become unreasonable outside of measured data.

As an alternative to the black and white calibration image illustrated in the various figures of this application, gray-code patterns can be used on both the external display screen 202 and the AR headset 100. This can allow for saving a set of ray-direction-mappings to optimize against with a gradient-descent optimizer, using the gradients from the ray tracer. This alternative approach may improve both the speed and precision of the calibration.

Figure 3A:
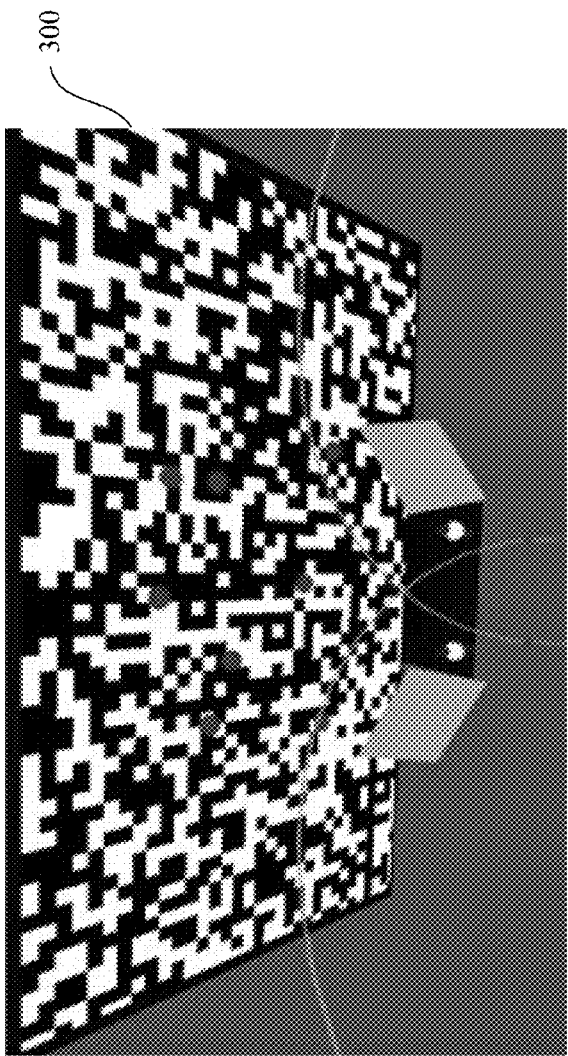
FIG. 3A illustrates an example calibration image as displayed by an external display screen.
Figure 3B:
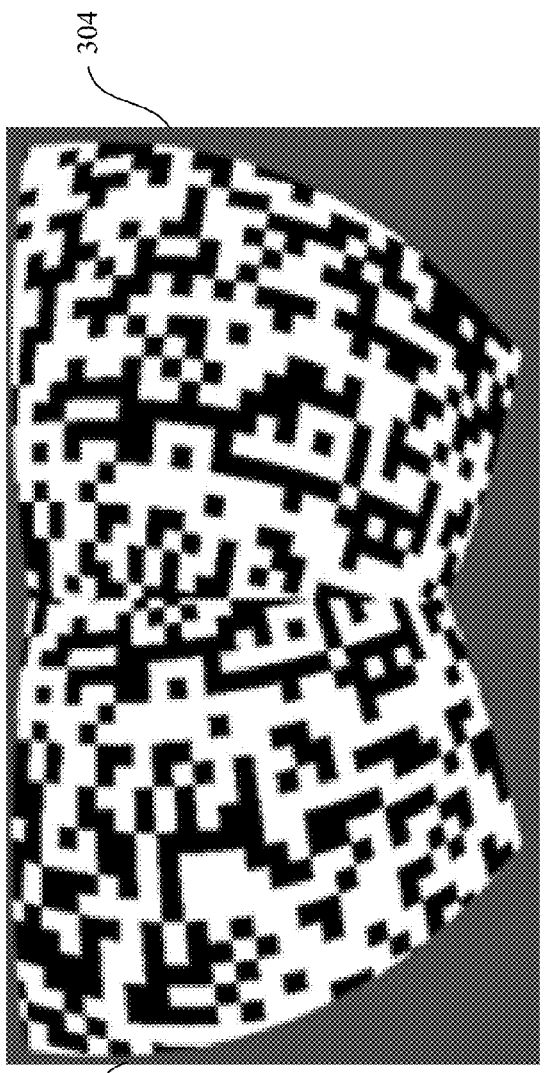
FIG. 3B illustrates an example inverted calibration image as projected onto left and right reflectors of an AR headset.

FIG. 3A illustrates an example calibration image as displayed by an external display screen and FIG. 3B illustrates an example inverted calibration image as projected onto left and right reflectors of an AR headset.

Specifically, FIG. 3A illustrates the calibration image 300 as displayed by, for example, the external display screen 202 of FIG. 2. Various graphics overly the calibration image 300 of FIG. 3A. These various graphics are not part of the calibration image 300, but rather illustrate the field of view and perspective of the AR headset while the calibration image 300 is being displayed by the external display screen 202. For example, the red dots illustrated in FIG. 3A that are overlaying the calibration image 300 represent the triangulated points, from the above-described triangulation, which constrain the virtual monitor (e.g., constrain the cameras 204, 206 with respect to the external display screen 202) in space. The green lines represent the edges of the ellipsoids, which the (ellipsoidal) reflectors 106, 108 are a cross section of. The blue dots represent the principal points of the cameras 204, 206. The white dots represent the current perspective from which the ray tracer is casting its rays, to create the distortion compensation. The two red dots near the bottom of FIG. 3A represent the Inner Foci of each of the ellipsoids.

FIG. 3B illustrates an inverse of calibration image 300 as reflected by reflectors of the AR headset. Specifically, FIG. 3B illustrates inverse calibration image 302, as projected onto a left-eye reflector of an AR headset and illustrates an inverse calibration image 304, as projected onto a right-eye reflector of the AR headset. The inverse calibration images 302, 304 are both the inverse of calibration image 300, even though they appear as two different images. As can be seen from FIGS. 3A and 3B, only portions of the inverse calibration images 302, 304 are actually reflected by the reflectors of the AR headset. In other words, inverse calibration image 302 that is presently reflected is only a portion of the inversion of the entire calibration image 300 and inverse calibration image 304 that is presently reflected in only a portion of the inversion of the entire calibration image 300. The inverse calibration images 302, 304 may be reflected such that overlapping portions of the inversion of the calibration image 300 are reflected on both the right-eye reflector of the AR headset and the left-eye reflector of the AR headset.

Additionally, as can be seen by comparing the calibration image of FIG. 3A and the inverse calibration images 302, 304 of FIG. 3B, the inverse calibration images 302, 304 do not match up with the orientation and perspective of the calibration image 300. As such, when the inverse calibration images 302, 304 are viewed by cameras (or by the user) the inverse calibration images 302, 304 will not cancel out the calibration image 300 as also viewed by the cameras (or by the user). This means that the AR headset is not calibrated very well.

Figure 4A:
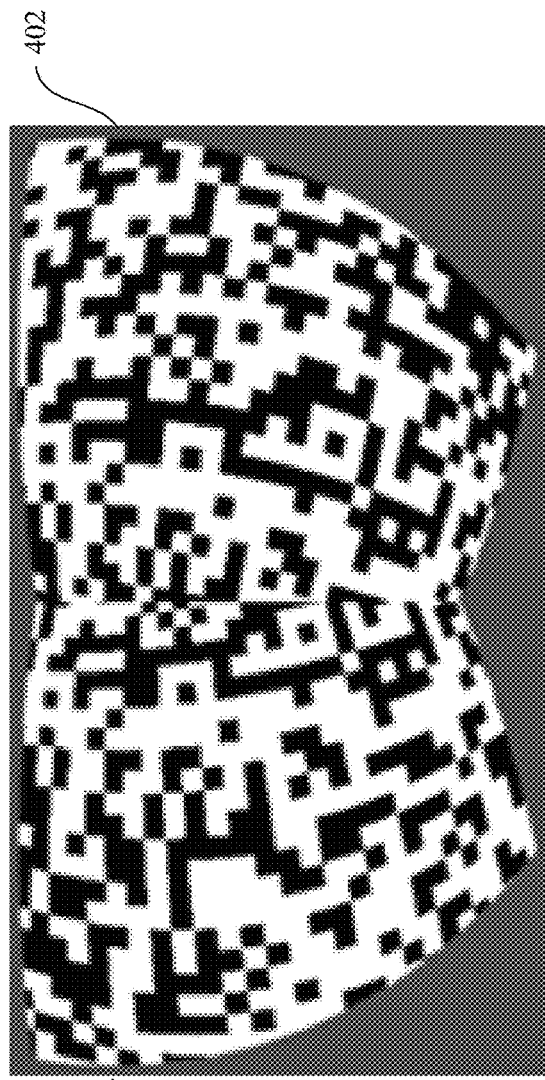
FIG. 4A illustrates an example inverse calibration image as reflected by left-eye and right-eye reflectors of an AR headset before calibration.
Figure 4B:
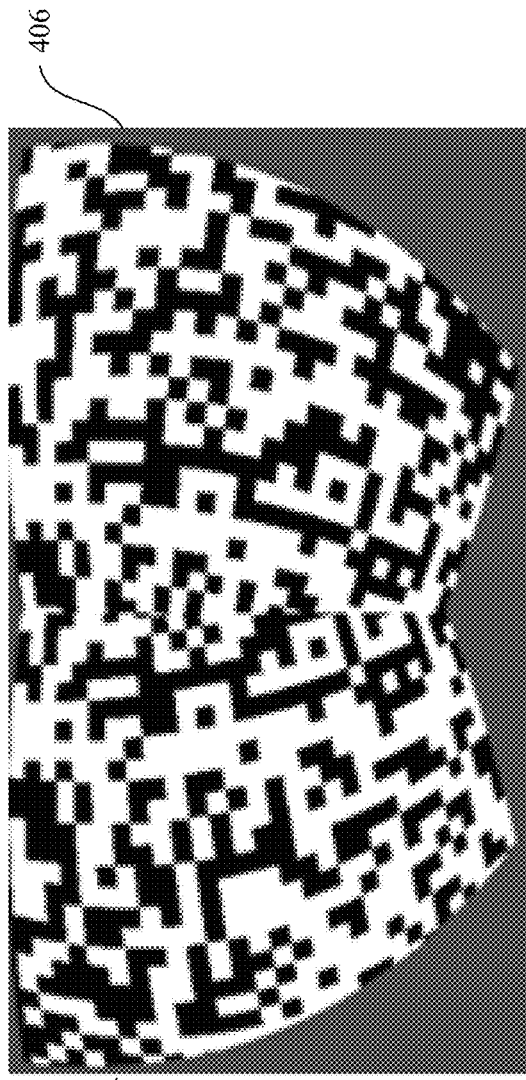
FIG. 4B illustrates an example inverted calibration image as reflected by left-eye and right-eye reflectors of the AR headset after calibration.

FIG. 4A illustrates an example inverse calibration image as reflected by left-eye and right-eye reflectors of an AR headset before calibration and FIG. 4B illustrates an example inverted calibration image as reflected by left-eye and right-eye reflectors of the AR headset after calibration.

Specifically, FIG. 4A illustrates inverse calibration image 400, as reflected by the left-eye reflector of the AR headset and also illustrates inverse calibration image 402, as reflected by the right-eye reflector of the AR headset. Inverse calibration images 400, 402 are the same as inverse calibration images 302, 304 of FIG. 3B. FIG. 4B illustrates, after a calibration is performed, inverse calibration image 404, as reflected by the left-eye reflector of the AR headset and illustrates, after calibration is performed, inverse calibration image 406, as reflected by the right-eye reflector of the AR headset. As can be seen by respectively comparing inverse calibration images 400, 402 of FIG. 4A and inverse calibration images 404, 406 of FIG. 4B, the inverse calibration images 404, 406 have been shifted so that they more closely align with the calibration image 300 displayed by the external display screen 202.

Figure 5A:
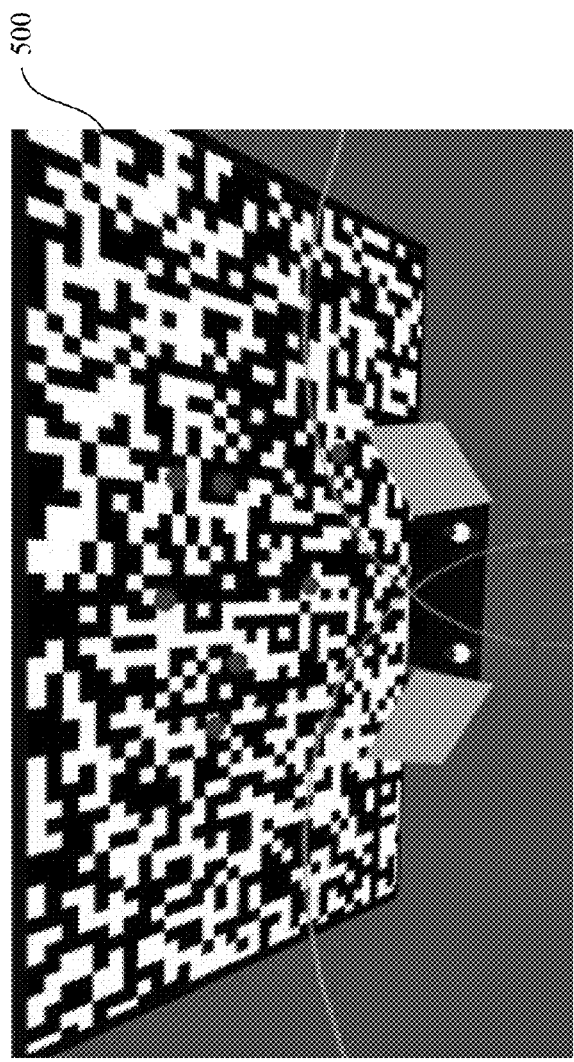
FIG. 5A illustrates an example calibration image as displayed by an external display screen.
Figure 5B:
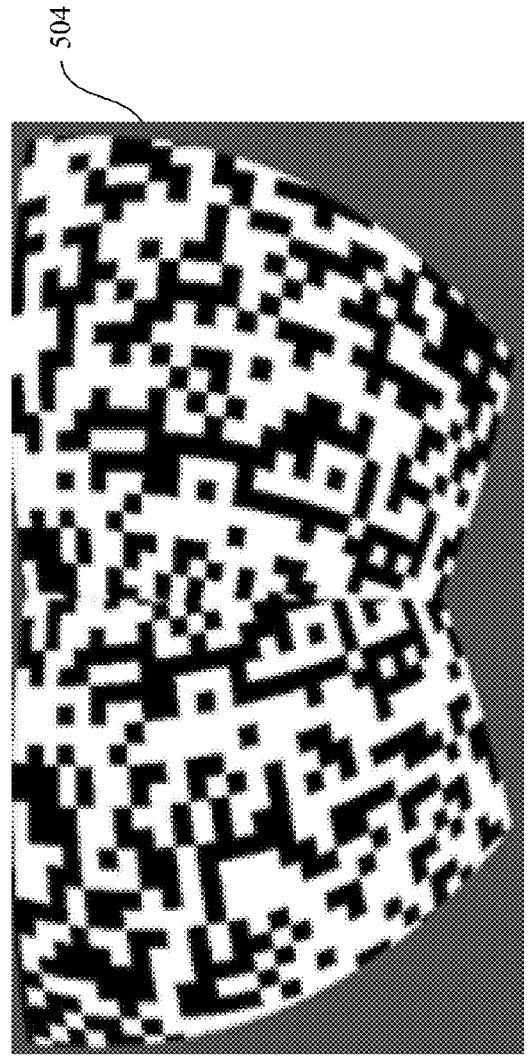
FIG. 5B illustrates an example inverted calibration image as projected onto left and right reflectors of an AR headset after a calibration has been performed.

FIG. 5A illustrates an example calibration image as displayed by an external display screen and FIG. 5B illustrates an example inverted calibration image as projected onto left and right reflectors of an AR headset after a calibration has been performed.

Similar to FIG. 3A, FIG. 5A illustrates the calibration image 500 as displayed by, for example, the external display screen 202 of FIG. 2. Various graphics overly the calibration image 500 of FIG. 5A. These various graphics are not part of the calibration image 500, but rather illustrate the field of view and perspective of the AR headset while the calibration image 500 is being displayed by the external display screen 202. For example, the red dots illustrated in FIG. 5A that are overlaying the calibration image 500 represent the triangulated points, from the above-described triangulation, which constrain the virtual monitor (e.g., constrain the cameras 204, 206 with respect to the external display screen 202) in space. The green lines represent the edges of the ellipsoids, which the (ellipsoidal) reflectors 106, 108 are a cross section of. The blue dots represent the principal points of the cameras 204, 206. The white dots represent the current perspective from which the ray tracer is casting its rays, to create the distortion compensation. The two red dots near the bottom of FIG. 5A represent the Inner Foci of each of the ellipsoids.

FIG. 5B illustrates an inverse of calibration image 500 as reflected by reflectors of the AR headset. Specifically, FIG. 5B illustrates inverse calibration image 502, as projected onto a left-eye reflector of an AR headset after calibration and illustrates an inverse calibration image 504, as projected onto a right-eye reflector of the AR headset after calibration. Further, as illustrated, the inverse calibration images 502, 504 are closer to being aligned with (e.g., matching) corresponding portions of the calibration image 500, as opposed to the inverse calibration images 302, 304 being aligned with (e.g., matching) corresponding portion of the calibration image 500. This calibration, as performed, compensates for any manufacturing deviations in the AR headset than can cause distortions, as perceived by the user.

Figure 6:
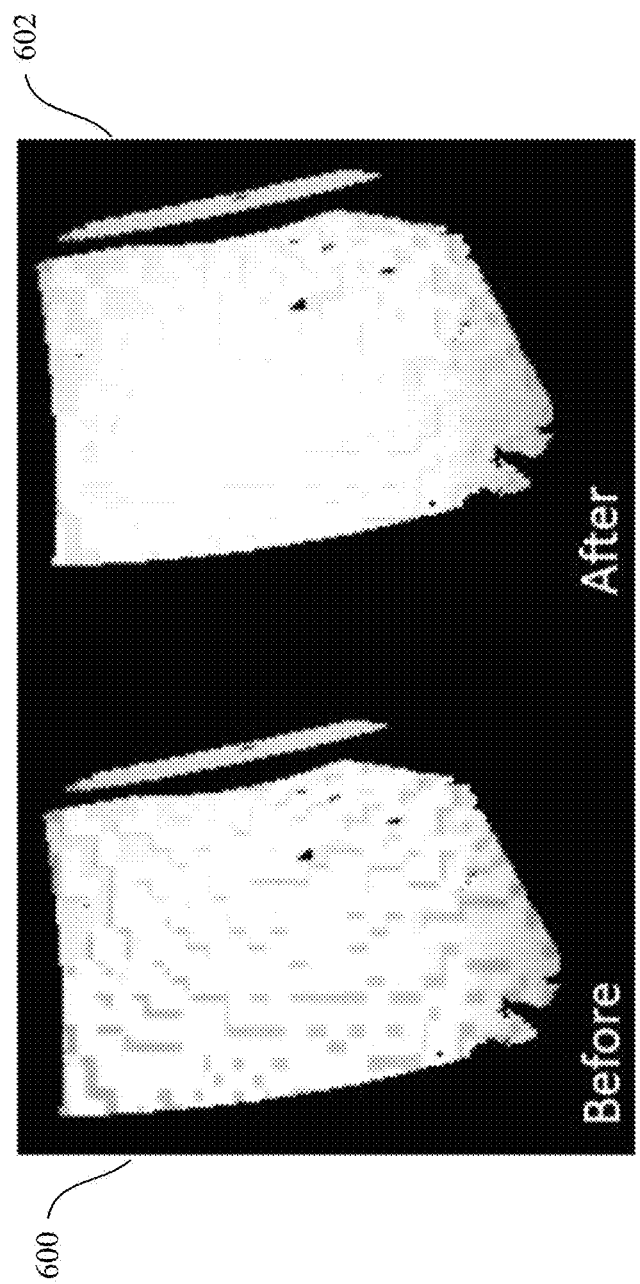
FIG. 6 illustrates actual before and after calibration images as viewed by a camera through a reflector of an AR headset.

FIG. 6 illustrates actual before and after calibration images as viewed by a camera through a reflector of an AR headset. Specifically, FIG. 6 illustrates an actual screen capture by, for example, the camera 204 of FIG. 2, taken while viewing, for example, both (i) the calibration image 500 as viewed through the left-eye reflector of the AR headset and (ii) the inverted calibration image 502 as reflected by the left-eye reflector of the AR headset. Screen capture 600 is the view of the camera 204 before calibration and screen capture 602 is the view of the camera 204 after calibration. As clearly illustrated, screen capture 600 includes a significant portion of the calibration image 500 overlaid by the inverted calibration image 502. In other words, the calibration image 500 and the inverted calibration image 502 do not cancel each other out, which would result in the camera 204 observing "white space."

In contrast, screen capture 602 has more "white space" as a result of the calibration, such that the calibrated inverted calibration image 502 cancels out more of the calibration image 500. The calibrator (i.e., the person and/or machine performing the calibration) can determine and set a threshold of how much of the calibration image 500 must be cancelled out by the inverted calibration image 502. This can be done by, for example, measuring the amount of "white space" in the screen capture 602.

Figure 7:
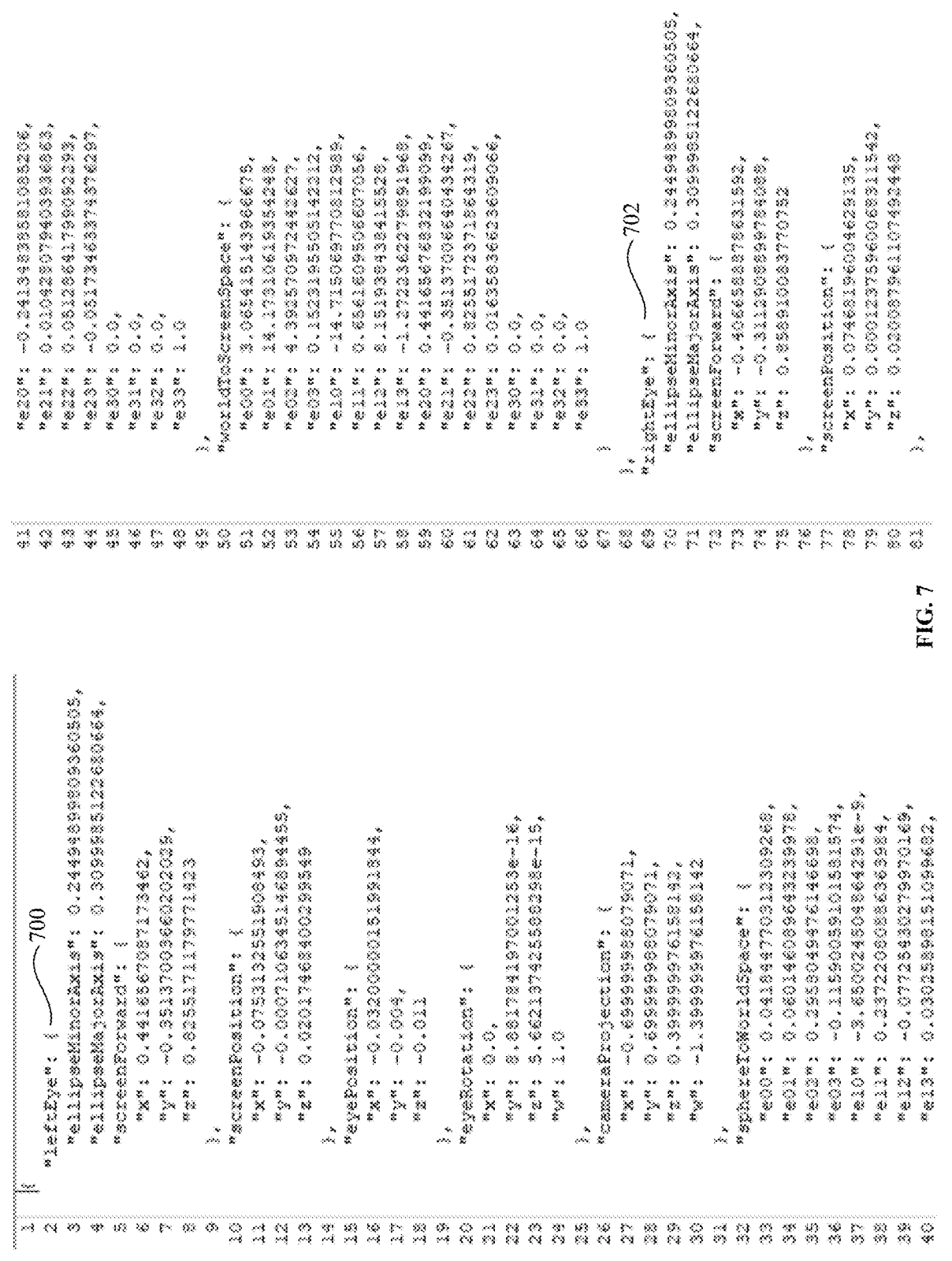
Figure 8:
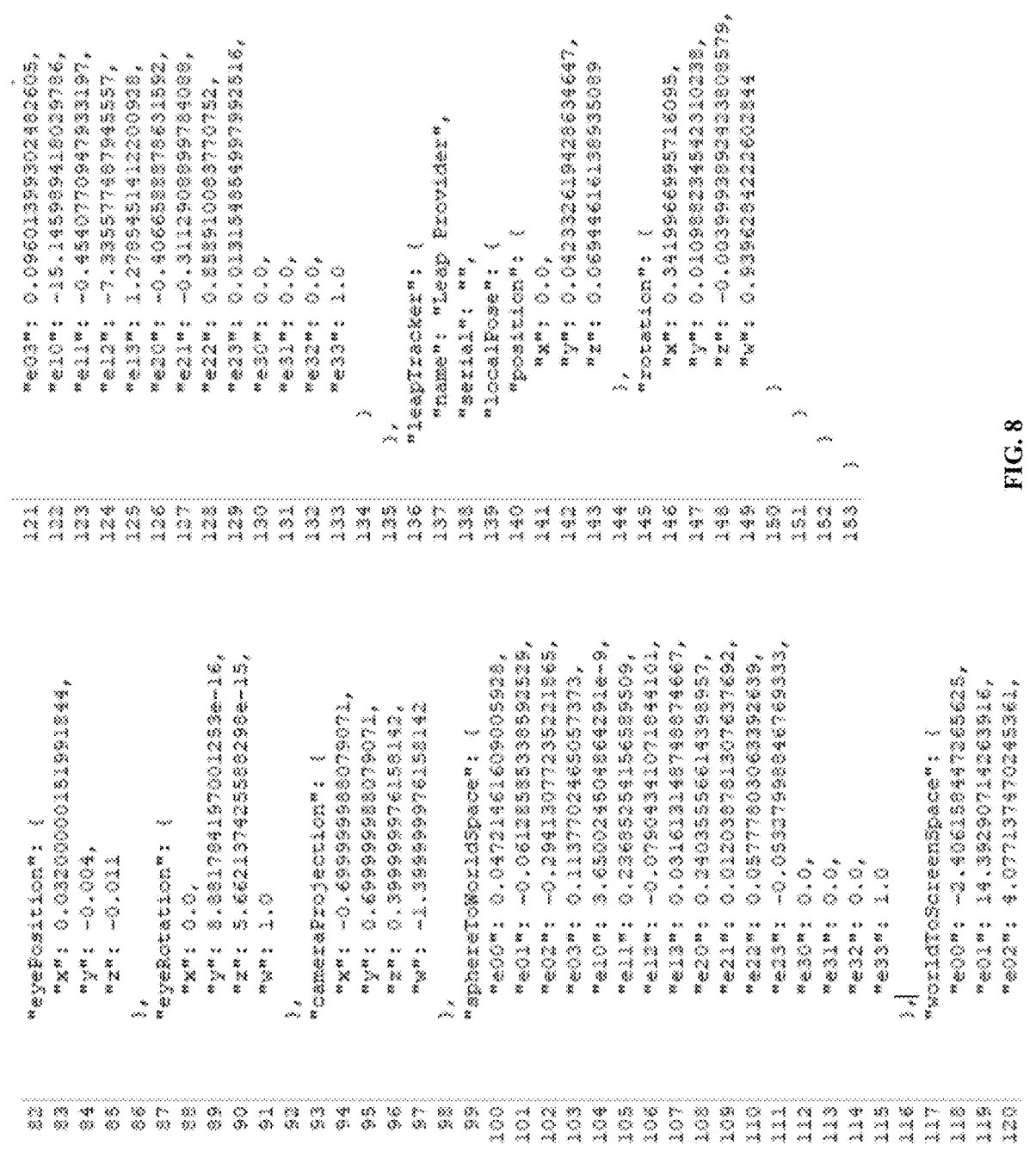

FIGS. 7 and 8 list an example distortion mapping transform, expressed in JSON, that gets loaded onto the AR headset 100 or that is continuously updated during an AR experience, as described above. This distortion mapping transform can be utilized by, for example, an AR headset engine (not illustrated) to compensate for distortions caused by manufacturing deviations or by moving or shifting of the AR headset 100 during use or by differences in head size, head shape and/or IPD. In another implementation the distinct distortion mapping transform gets stored in the headset hardware. In yet another case, distortion mapping transforms can be stored in the cloud and delivered, based on the headset's serial number.

The distinct distortion mapping transform illustrated in FIGS. 7 and 8 lists designations for the left-eye optics 700 and right-eye optics 702. With respect to the left-eye optics 700, a description of an ellipsoidal reflector's sizing, position and rotation are defined in 'ellipseMinorAxis', 'ellipseMajorAxis', and 'sphereToWorldSpace' variables (see lines 3, 4 and 32-49, respectively, of FIG. 7, for example). Further, with respect to the left-eye optics 700, the distinct distortion mapping transform also includes a description of the screen's transform and sizing, in the 'screenForward', 'screenPosition', and 'worldToScreenSpace' variables (see lines 5-9, 10-14 and 50-60, respectively, of FIG. 7, for example). Additionally, with respect to the left-eye optics 700, the distinct distortion mapping transform further includes a description of where the eye's assumed/default position and field of view is, in the 'eyePosition', 'eyeRotation', and 'cameraProjection' variables (see lines 15-19, 20-25, and 26-31, respectively, of FIG. 7, for example). Similar variables are listed for the right-eye optics 702 in FIGS. 7 and 8.

Figure 9:
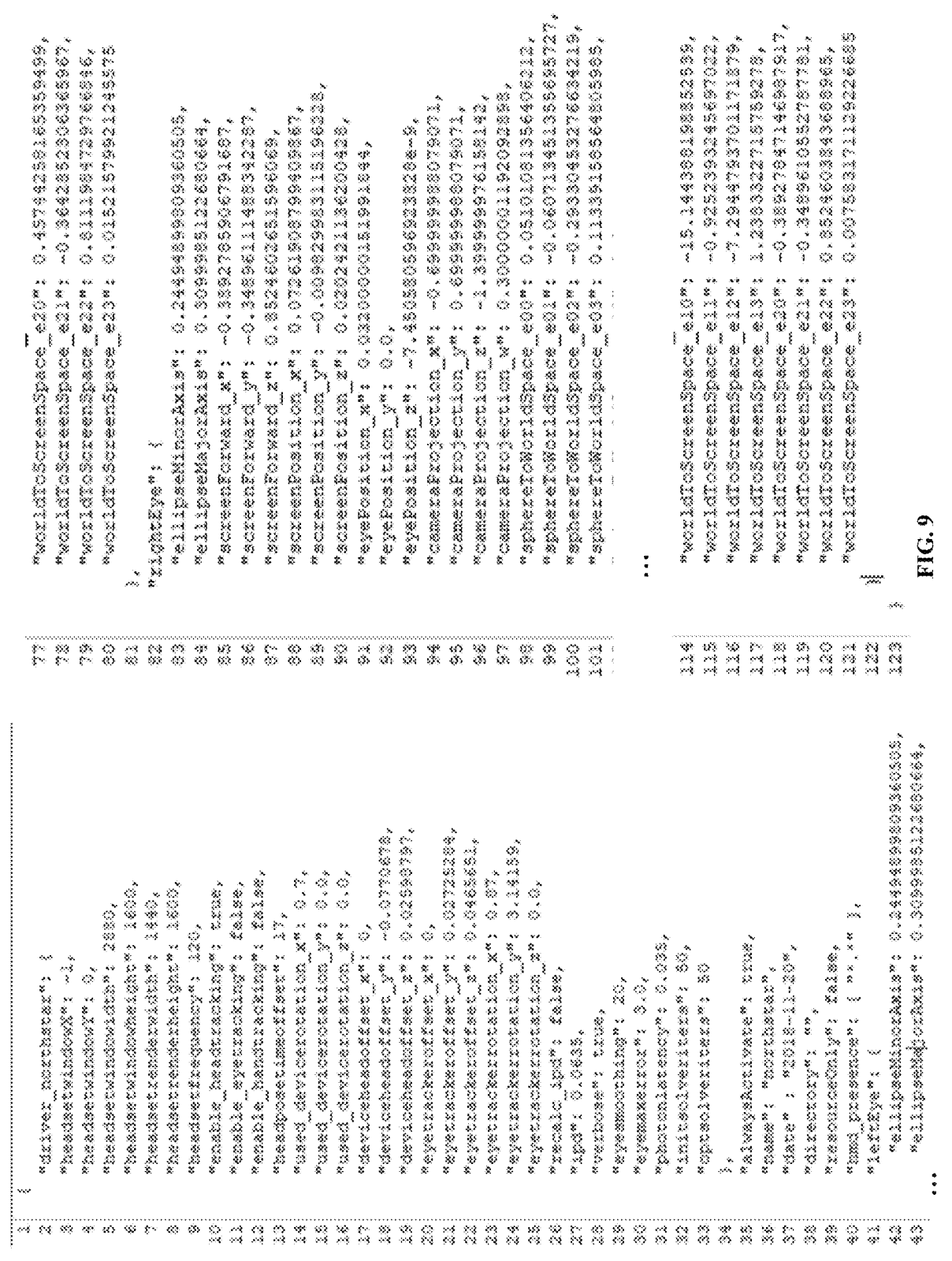

FIG. 9 illustrates an example distortion mapping transform for a specific headset, such as a SteamVR® headset that uses specific metadata. For example, different headsets can utilize different information (e.g., metadata) for calibration purposes and the distortion mapping transform can include these different sets of metadata. FIG. 9 lists the example distortion mapping for the SteamVR® headset as a result of performing a calibration.

Figure 10:
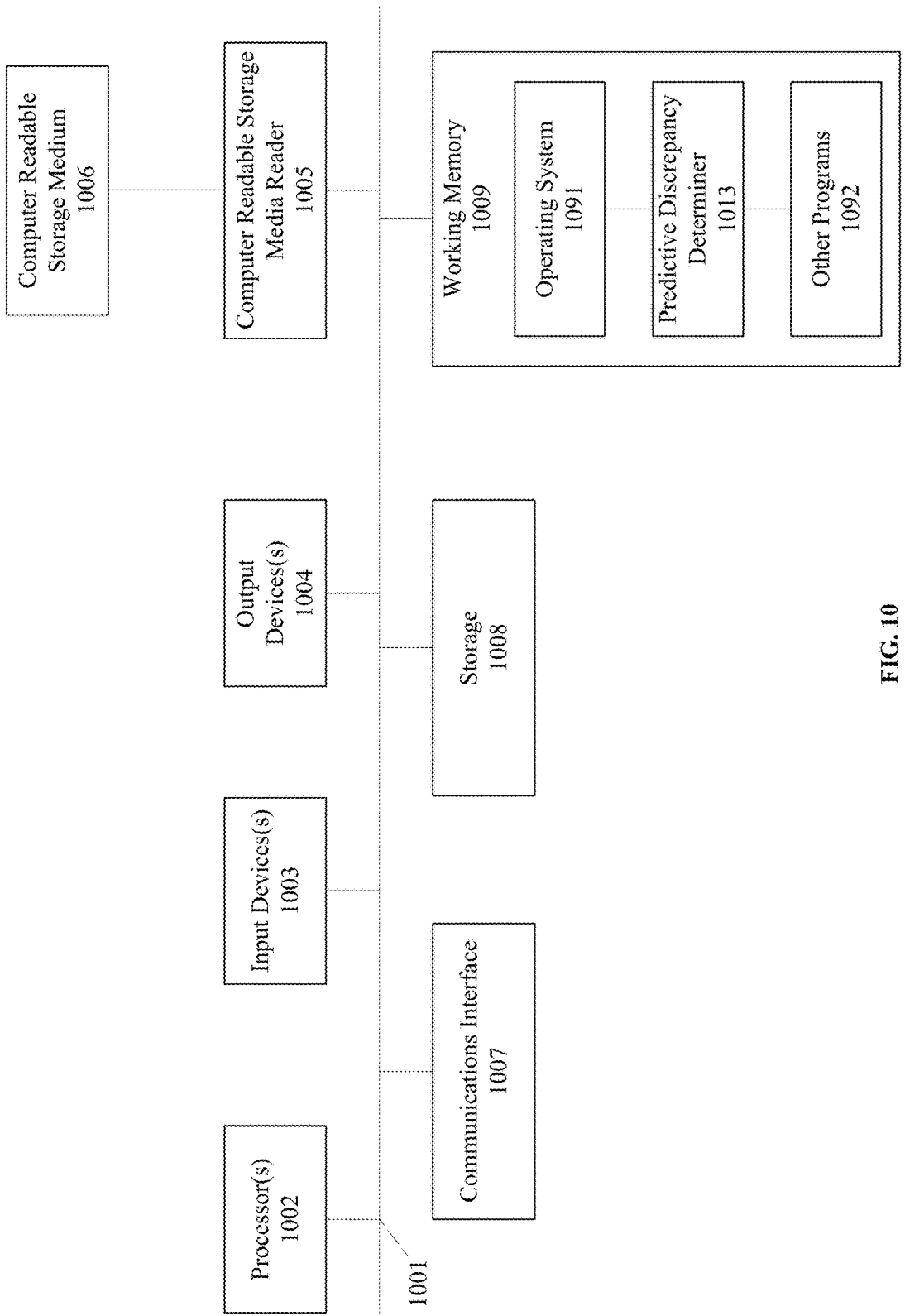
FIG. 10 illustrates an example computing system that can comprise one or more of the elements shown in FIGS. 1 and 2.

FIG. 10 illustrates an example computing system that can comprise one or more of the elements shown in FIGS. 1 and 2. In particular, FIG. 10 illustrates an exemplary computing system 1000, such as a PC (or other suitable "processing" system), that can comprise one or more of the elements shown in FIGS. 1-2 according to an implementation.

As shown, computer system 1000 comprises elements coupled via communication channels (e.g. bus 1001) including one or more general or special purpose processors 1002, such as a Pentium® or Power PC®, digital signal processor ("DSP"), or other processing. System 1000 elements also include one or more input devices 1003 (such as a mouse, keyboard, joystick, microphone, remote control unit, tactile, biometric or other sensors, and so on), and one or more output devices 1004, such as a suitable display, joystick feedback components, speakers, biometric or other actuators, and so on, in accordance with a particular application.

System 1000 elements also include a computer readable storage media reader 1005 coupled to a computer readable storage medium 1006, such as a storage/memory device or hard or removable storage/memory media; examples are further indicated separately as storage device 1008 and non-transitory (working) memory 1009, which can include hard disk variants, floppy/compact disk variants, digital versatile disk ("DVD") variants, smart cards, read only memory, random access memory, cache memory or others, in accordance with a particular application. One or more suitable communication interfaces or devices 1007 can also be included, such as a modem, DSL, infrared, etc. for providing inter-device communication directly or via suitable private or public networks, such as the Internet. Non-transitory (working) memory 1009 is further indicated as including an operating system ("OS") 1091, predictive discrepancy determiner 1013 and other programs 1092, such as application programs, mobile code, data, or other information for implementing various elements of FIGS. 1 and 2, which might be stored or loaded therein during use.

System 1000 element implementations can include hardware, software, firmware, or a suitable combination. When implemented in software (e.g., as an application program, object, downloadable, servlet, and so on, in whole or part), a system 1000 element can be communicated transitionally or more persistently from local or remote storage to memory for execution, or another suitable mechanism can be utilized, and elements can be implemented in compiled, simulated, interpretive or other suitable forms. Input, intermediate or resulting data or functional elements can further reside more transitionally or more persistently in a storage media or memory, (e.g., storage device 1008 or memory 1009) in accordance with a particular application.

Certain potential interaction determination, virtual object selection, authorization issuances and other aspects enabled by input/output processors and other element implementations disclosed herein can also be provided in a manner that enables a high degree of broad or even global applicability; these can also be suitably implemented at a lower hardware/ software layer. Note, however, that aspects of such elements can also be more closely linked to a particular application type or machine, or might benefit from the use of mobile code, among other considerations; a more distributed or loosely coupled correspondence of such elements with OS processes might thus be more desirable in such cases.

Particular Implementations

One implementation discloses a computer-implemented method of using an AR calibration system to compensate for distortions caused by manufacturing deviations in an AR headset. The method comprises providing a calibration image to an external display screen that is external to the AR headset and that is viewable through a reflector of the AR headset and providing an inverse of the calibration image to a display of the AR headset, such that the inverse calibration image is reflected off of the reflector and observed by a camera of the AR calibration system while the camera is simultaneously observing the calibration image on the external display screen. The camera of the AR calibration system is located inside or within viewing distance of the AR headset at a location representing a user's point of view, and the camera of the AR calibration system is aligned to a position that allows the camera to observe, from an optimal viewing location, the inverse calibration image projected onto the reflector of the AR headset. The method also includes creating a distortion mapping transform by implementing an algorithm to search through various projection positions of the inverse calibration image provided to the display of the AR headset until the inverse calibration image observed by the camera cancels out an acceptable portion of the calibration image provided to the external display screen as observed through the reflector by the camera. The method further includes providing the distortion mapping transform for implementation by the AR headset when an end user begins an AR experience in order to compensate for the distortions caused by manufacturing tolerances.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations.

For some implementations of the disclosed method, the AR headset is located on a stationary testing base during the providing of the inverse calibration image.

For one implementation of the disclosed method, the AR headset includes two reflectors, a right-eye reflector for a right-eye and a left-eye reflector for a left-eye, and the AR headset also includes two displays, a right-eye display and a left-eye display. The disclosed method further comprises providing the inverse calibration image to both the right-eye display and the left-eye display, such that (i) the inverse calibration image is displayed by the right-eye display, reflected off of the right-eye reflector and observed by the camera while the camera is simultaneously observing the calibration image on the external display screen and (ii) the inverse calibration image is displayed by the left-eye display, reflected off of the left-eye reflector and observed by the camera while the camera is simultaneously observing the calibration image on the external display screen.

For one implementation of the disclosed method, the AR calibration system includes two cameras, a right-eye camera and a left-eye camera, and the method further comprises aligning the right-eye camera to a position within the AR headset that allows the right-eye camera to observe, from an optimal right-eye viewing location, the inverse calibration image projected onto the right-eye reflector of the AR headset, and aligning the left-eye camera to a position within the AR headset that allows the left-eye camera to observe, from an optimal left-eye viewing location, the inverse calibration image projected onto the left-eye reflector of the AR headset. The inverse calibration image is displayed by the right-eye display, reflected off of the right-eye reflector and observed by the right-eye camera while the right-eye camera is simultaneously observing the calibration image on the external display screen. The inverse calibration image is displayed by the left-eye display, reflected off of the left-eye reflector and observed by the left-eye camera while the left-eye camera is simultaneously observing the calibration image on the external display screen. The method further comprises creating the distortion mapping transform by implementing the algorithm to independently search through the various projection positions of the inverse calibration image provided to (i) the right-eye display until the inverse calibration image observed by the right-eye camera cancels out an acceptable portion of the calibration image provided to the external display screen as observed through the right-eye reflector by the right-eye camera and (ii) the left-eye display until the inverse calibration image observed by the left-eye camera cancels out an acceptable portion of the calibration image provided to the external display screen as observed through the left-eye reflector by the left-eye camera.

For another implementation of the disclosed method, the AR calibration system includes four cameras, a first right-eye camera, a second right-eye camera, a first left-eye camera and a second left-eye camera. The method further comprises aligning the first right-eye camera to a position within the AR headset that allows the first right-eye camera to observe, from an optimal first right-eye viewing location, the inverse calibration image projected onto the right-eye reflector of the AR headset. The method also includes aligning the second right-eye camera to a position within the AR headset that allows the second right-eye camera to observe, from an optimal second right-eye viewing location, the inverse calibration image projected onto the right-eye reflector of the AR headset. The method further includes aligning the first left-eye camera to a position within the AR headset that allows the first left-eye camera to observe, from an optimal first left-eye viewing location, the inverse calibration image projected onto the left-eye reflector of the AR headset, and aligning the second left-eye camera to a position within the AR headset that allows the second left-eye camera to observe, from an optimal second left-eye viewing location, the inverse calibration image projected onto the left-eye reflector of the AR headset. The inverse calibration image is displayed by the right-eye display, reflected off of the right-eye reflector and observed by the first right-eye camera and the second right-eye camera while the first right-eye camera and the second right-eye camera are simultaneously observing the calibration image on the external display screen. The inverse calibration image is displayed by the left-eye display, reflected off of the left-eye reflector and observed by the first left-eye camera and the second left-eye camera while the first left-eye camera and the second left-eye camera are simultaneously observing the calibration image on the external display screen. The disclosed method further comprises creating the distortion mapping transform by implementing the algorithm to independently search through various projection positions of the inverse calibration image provided to (i) the right-eye display until the inverse calibration image observed by the first right-eye camera cancels out an acceptable portion of the calibration image provided to the external display screen as observed through the right-eye reflector by the first right-eye camera, (ii) the right-eye display until the inverse calibration image observed by the second right-eye camera cancels out an acceptable portion of the calibration image provided to the external display screen as observed through the right-eye reflector by the second right-eye camera, (iii) the left-eye display until the inverse calibration image observed by the first left-eye camera cancels out an acceptable portion of the calibration image provided to the external display screen as observed through the left-eye reflector by the first left-eye camera and (iv) the left-eye display until the inverse calibration image observed by the second left-eye camera cancels out an acceptable portion of the calibration image provided to the external display screen as observed through the left-eye reflector by the second left-eye camera. For some implementations, the first right-eye camera is an upper right-eye camera, the second right-eye camera is a lower right-eye camera, the first left-eye camera is an upper left-eye camera, and the second left-eye camera is a lower left-eye camera.

For some implementations of the disclosed method, the AR calibration system includes the implemented algorithm triangulates a position of the camera with respect to the reflector and the display, such that the triangulated position of the camera is used to create the distortion mapping transform.

For some implementations of the disclosed method, the algorithm searches through various projection positions of the inverse calibration image using a system-in-the-loop gradient-less optimizer. In one implementation of the method, the system-in-the-loop gradient-less optimizer is a Nelder-Mead optimizer.

For some implementations of the disclosed method, the distortion mapping transform is stored in the AR headset for implementation during the AR experience of the user. In other cases, the distortion mapping transform is stored in a database for later use and each distinct AR headset accesses a distinct distortion mapping transform stored relative to the serial number of the AR headset.

Another implementation includes the disclosed method of contemporaneously updating a distortion mapping transform implemented by an AR headset while a user is in an AR experience. The method comprises for each video frame of the AR experience: performing eye tracking to identify (i) a location of both eyes of the user with respect to a reflector and/or a display of the AR headset and (ii) a viewing direction of both eyes of the user with respect to the reflector and/or the display of the AR headset. The method also comprises updating the distortion mapping transform to compensate for (i) a change in a location of either of the user's eyes with respect to the reflector and/or the display of the AR headset and (ii) a change in a viewing direction of either of the user's eyes with respect to the reflector and/or the display. The method further comprises implementing the updated distortion mapping transform in a next display frame of the AR experience. For some implementations of the disclosed method, a pre-calibrated distortion mapping transform is implemented by the AR headset prior to the AR experience and the updating of the distortion mapping transform initially updates the pre-calibrated distortion mapping transform.

Other implementations of the disclosed technology described in this section can include a tangible non-transitory computer readable storage medium having computer program instructions recorded thereon, the computer program instructions for using an augmented reality (AR)

calibration system to compensate for distortions caused by manufacturing deviations in an AR headset and the computer program instructions, when executed on a processor, cause the processor to perform any of the methods described above. For one implementation of the non-transitory computer-readable recording medium, a pre-calibrated distortion mapping transform is implemented by the AR headset prior to the AR experience and the updating of the distortion mapping transform initially updates the pre-calibrated distortion mapping transform.

Another implementation of the disclosed technology described in this section can include an AR calibration system including a camera, an external display screen, a stationary testing base, one or more processors coupled to memory, the memory loaded with computer program instructions to compensate for distortions caused by manufacturing deviations in a AR headset, the computer program instructions, when executed on the one or more processors, implement actions comprising providing a calibration image to the external display screen that is external to the AR headset and that is viewable through a reflector of the AR headset and providing an inverse of the calibration image to a display of the AR headset, such that the inverse calibration image is reflected off of the reflector and observed by the camera of the AR calibration system while the camera is simultaneously observing the calibration image on the external display screen. The camera of the AR calibration system is located inside or within viewing distance of the AR headset at a location representing a user's point of view, and the camera of the AR calibration system is aligned to a position that allows the camera to observe, from an optimal viewing location, the inverse calibration image projected onto the reflector of the AR headset. The actions also comprise creating a distortion mapping transform by implementing an algorithm to search through various projection positions of the inverse calibration image provided to the display of the AR headset until the inverse calibration image observed by the camera cancels out an acceptable portion of the calibration image provided to the external display screen as observed through the reflector by the camera, and providing the distortion mapping transform for implementation by the AR headset when an end user begins an AR experience in order to compensate for the distortions caused by manufacturing tolerances.

Yet another implementation of the disclosed technology described in this section can include an AR calibration system including a camera, an external display screen, a stationary testing base, one or more processors coupled to memory, the memory loaded with computer program instructions to update a distortion mapping transform implemented by an AR headset while a user is in an AR experience. The computer program instructions, when executed on a processor, cause the processor to implement actions comprising, for each video frame of the AR experience: performing eye tracking to identify (i) a location of both eyes of the user with respect to a reflector and/or a display of the AR headset and (ii) a viewing direction of both eyes of the user with respect to the reflector and/or the display of the AR headset. Additional actions include updating the distortion mapping transform to compensate for (i) a change in a location of either of the user's eyes with respect to the reflector and/or the display of the AR headset and (ii) a change in a viewing direction of either of the user's eyes with respect to the reflector and/or the display, and implementing the updated distortion mapping transform in a next display frame of the AR experience. The disclosed system is operable to perform any of the methods described above. In one implementation of the system, a pre-calibrated distortion mapping transform is implemented by the AR headset prior to the AR experience and the updating of the distortion mapping transform initially updates the pre-calibrated distortion mapping transform.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein. The scope of the technology disclosed is defined by the appended claims.

The invention claimed is:

1. A method comprising:
    providing a calibration image to a display screen that is viewable through a reflector of an AR headset;
    providing an inverse of the calibration image to a display of the AR headset, such that the inverse calibration image is reflected from the reflector and observed by a camera while the camera is simultaneously observing the calibration image on the display screen,
    wherein the camera observes the inverse calibration image projected onto the reflector of the AR headset;
    creating a distortion mapping transform, such that a projection position of the inverse calibration image provided to the display of the AR headset, as observed by the camera, cancels out an acceptable portion of the calibration image as observed through the reflector by the camera; and
    providing the distortion mapping transform for implementation by the AR headset.

2. The method of claim 1, wherein
    the AR headset is located on a stationary testing base during the providing of the inverse calibration image.

3. The method of claim 1,
    wherein the AR headset includes two reflectors, a right-eye reflector for a right eye and a left-eye reflector for a left eye, wherein the AR headset includes two displays, a right-eye display and a left-eye display, and wherein the method further comprises:
    providing the inverse calibration image to both the right-eye display and the left-eye display, such that:
    (i) the inverse calibration image is displayed by the right-eye display, reflected from the right-eye reflector, and observed by the camera while the camera is simultaneously observing the calibration image, and
    (ii) the inverse calibration image is displayed by the left-eye display, reflected from the left-eye reflector, and observed by the camera while the camera is simultaneously observing the calibration image.

4. The method of claim 3,
    wherein an AR headset calibration system includes two cameras, a right-eye camera and a left-eye camera,
    wherein the method further comprises:
    aligning the right-eye camera to a position within the AR headset that allows the right-eye camera to observe, from an optimal right-eye viewing location, the inverse calibration image projected onto the right-eye reflector of the AR headset; and
    aligning the left-eye camera to a position within the AR headset that allows the left-eye camera to observe, from an optimal left-eye viewing location, the inverse calibration image projected onto the left-eye reflector of the AR headset, wherein the inverse calibration image is displayed by the right-eye display, reflected from the right-eye reflector, and observed by the right-eye camera while the right-eye camera is simultaneously observing the calibration image, wherein the inverse calibration image is displayed by the left-eye display, reflected from the left-eye reflector, and observed by the left-eye camera while the left-eye camera is simultaneously observing the calibration image, and wherein the method further comprises creating the distortion mapping transform by implementing an algorithm to independently search through various projection positions of the inverse calibration image provided to:

(i) the right-eye display until the inverse calibration image observed by the right-eye camera cancels out an acceptable portion of the calibration image as observed through the right-eye reflector by the right-eye camera, and (ii) the left-eye display until the inverse calibration image observed by the left-eye camera cancels out an acceptable portion of the calibration image as observed through the left-eye reflector by the left-eye camera.

5. The method of claim 3,
wherein an AR headset calibration system includes four cameras, a first right-eye camera, a second right-eye camera, a first left-eye camera and a second left-eye camera, wherein the method further comprises:

aligning the first right-eye camera to a position within the AR headset that allows the first right-eye camera to observe, from an optimal first right-eye viewing location, the inverse calibration image projected onto the right-eye reflector of the AR headset;

aligning the second right-eye camera to a position within the AR headset that allows the second right-eye camera to observe, from an optimal second right-eye viewing location, the inverse calibration image projected onto the right-eye reflector of the AR headset;

aligning the first left-eye camera to a position within the AR headset that allows the first left-eye camera to observe, from an optimal first left-eye viewing location, the inverse calibration image projected onto the left-eye reflector of the AR headset; and aligning the second left-eye camera to a position within the AR headset that allows the second left-eye camera to observe, from an optimal second left-eye viewing location, the inverse calibration image projected onto the left-eye reflector of the AR headset, wherein the inverse calibration image is displayed by the right-eye display, reflected from the right-eye reflector, and observed by the first right-eye camera and the second right-eye camera while the first right-eye camera and the second right-eye camera are simultaneously observing the calibration image on the display screen, wherein the inverse calibration image is displayed by the left-eye display, reflected from the left-eye reflector, and observed by the first left-eye camera and the second left-eye camera while the first left-eye camera and the second left-eye camera are simultaneously observing the calibration image on the display screen, and wherein the method further comprises creating the distortion mapping transform by
implementing an algorithm to independently search through various projection positions of the inverse calibration image provided to:

(i) the right-eye display until the inverse calibration image observed by the first right-eye camera cancels out an acceptable portion of the calibration image as observed through the right-eye reflector by the first right-eye camera, (ii) the right-eye display until the inverse calibration image observed by the second right-eye camera cancels out an acceptable portion of the calibration image as observed through the right-eye reflector by the second right-eye camera, (iii) the left-eye display until the inverse calibration image observed by the first left-eye camera cancels out an acceptable portion of the calibration image as observed through the left-eye reflector by the first left-eye camera, and (iv) the left-eye display until the inverse calibration image observed by the second left-eye camera cancels out an acceptable portion of the calibration image as observed through the left-eye reflector by the second left-eye camera.

6. The method of claim 5, wherein
the first right-eye camera is an upper right-eye camera, the second right-eye camera is a lower right-eye camera, the first left-eye camera is an upper left-eye camera, and the second left-eye camera is a lower left-eye camera.

7. The method of claim 4, wherein
the implemented algorithm triangulates a position of the camera with respect to the reflector and the display, such that the triangulated position of the camera is used to create the distortion mapping transform.

8. The method of claim 4, wherein
the algorithm searches through various projection positions of the inverse calibration image using a system-in-the-loop gradient-less optimizer.

9. The method of claim 8, wherein
the system-in-the-loop gradient-less optimizer is a Nelder-Mead optimizer.

10. The method of claim 1, wherein
the distortion mapping transform is stored in the AR headset.

11. A non-transitory computer-readable recording medium having computer program instructions recorded thereon, the computer program instructions, when executed on a processor, cause the processor to perform the method of claim 1.

12. The non-transitory computer-readable recording medium of claim 11, wherein the AR headset is located on a stationary testing base during the providing of the inverse calibration image.

13. An augmented reality (AR) headset calibration system including a camera, a display screen, a stationary testing base, one or more processors coupled to memory, the memory loaded with computer program instructions that, when executed on the one or more processors, implement actions comprising:

providing a calibration image to the display screen and that is viewable through a reflector of the AR headset;

providing an inverse of the calibration image to a display of the AR headset, such that the inverse calibration image is reflected from the reflector and observed by the camera while the camera is simultaneously observing the calibration image, wherein the camera observes the inverse calibration image projected onto the reflector of the AR headset;

creating a distortion mapping transform, such that a projection position of the inverse calibration image provided to the display of the AR headset, as observed by the camera, cancels out an acceptable portion of the calibration image as observed through the reflector by the camera; and providing the distortion mapping transform for implementation by the AR headset.

14. The system of claim 13, wherein the AR headset is located on a stationary testing base during the providing of the inverse calibration image.

15. A method of contemporaneously updating a distortion mapping transform implemented by an augmented reality (AR) headset, the method comprising:

for a display frame of an AR experience:

performing eye tracking to identify a location of at least one of a user's eyes with respect to at least one of a reflector and a display of the AR headset;

updating the distortion mapping transform to compensate for a change in the identified location of the at least one of the user's eyes with respect to one of the reflector and the display of the AR headset; and implementing the updated distortion mapping transform in a subsequent display frame of the AR experience.

16. The method of claim 15, wherein the performing of the eye tracking identifies a viewing direction of two eyes of the user with respect to the one of the reflector and the display of the AR headset, and wherein the updating of the distortion mapping transform compensates for a change in the identified viewing direction of either of the user's two eyes with respect to at least one of the reflector and the display.

17. The method of claim 15, wherein a pre-calibrated distortion mapping transform is implemented by the AR headset prior to the AR experience, and the updating of the distortion mapping transform initially updates the pre-calibrated distortion mapping transform.

18. A non-transitory computer-readable recording medium having computer program instructions recorded thereon, the computer program instructions for updating a distortion mapping transform implemented by an augmented reality (AR) headset while a user is in an AR experience and the computer program instructions, when executed on a processor, cause the processor to perform the method of claim 15.

19. The non-transitory computer-readable recording medium of claim 18, wherein a pre-calibrated distortion mapping transform is implemented by the AR headset prior to the AR experience and the updating of the distortion mapping transform initially updates the pre-calibrated distortion mapping transform.

20. An augmented reality (AR) calibration system including a camera, a display screen, a stationary testing base, one or more processors coupled to memory, the memory loaded with computer program instructions to update a distortion mapping transform implemented by an augmented reality (AR) headset while a user is in an AR experience, the computer program instructions, when executed on a processor, cause the processor to implement the method of claim 15.

* * * * *